(12) United States Patent
Soldevilla-Martinez (10) Patent No.: US 12,536,796 B2
(45) Date of Patent: Jan. 27, 2026

(54) REMOTE SOIL AND VEGETATION PROPERTIES DETERMINATION METHOD AND SYSTEM

(71) Applicant: Yara International ASA, Oslo (NO)

(72) Inventor: Maria Soldevilla-Martinez, Dülmen (DE)

(73) Assignee: YARA INTERNATIONAL ASA, Oslo (NO)

( * ) Notice: Subject to any disclaimer, the term of this patent is extended or adjusted under 35 U.S.C. 154(b) by 293 days.

(21) Appl. No.: 18/274,579

(22) PCT Filed: Feb. 15, 2022

(86) PCT No.: PCT/EP2022/053604
§ 371 (c)(1),
(2) Date: Jul. 27, 2023

(87) PCT Pub. No.: WO2022/175236
PCT Pub. Date: Aug. 25, 2022

(65) Prior Publication Data
US 2024/0087311 A1    Mar. 14, 2024

(30) Foreign Application Priority Data
Feb. 22, 2021    (EP) .................................... 21158424

(51) Int. Cl.
*G06V 20/10* (2022.01)
(52) U.S. Cl.
CPC .......... *G06V 20/188* (2022.01); *G06V 20/194* (2022.01)

(58) Field of Classification Search
None
See application file for complete search history.

(56) References Cited

U.S. PATENT DOCUMENTS

2007/0089390 A1* 4/2007 Hendrickson .......... A01D 91/00
                                                        56/10.2 F
2017/0161560 A1* 6/2017 Itzhaky .................... G06N 3/08
(Continued)

FOREIGN PATENT DOCUMENTS

CN        106682625        5/2017

OTHER PUBLICATIONS

International Preliminary Report on Patentability issued in App. No. PCT/EP2022/053604, dated Jun. 14, 2023, 15 pages.

(Continued)

*Primary Examiner* — Henok Shiferaw
(74) *Attorney, Agent, or Firm* — DILWORTH IP, LLC (57) ABSTRACT

A computer-implemented method for determining soil and/or vegetation properties of an agricultural field, wherein the method includes the steps of: receiving remote data over a plurality of time frames, wherein the remote data includes data from at least one determined location including a plurality of spectral bands or optical domains of different wavelengths; and processing the remote data, wherein processing the remote data includes the steps of: generating at least one coefficient derived from the remote data; determining a rate of change of the at least one coefficient at the plurality of time frames; and determining at least one soil and/or vegetation property value based on the rate of change of the at least one generated coefficient for at least one of the plurality of time frames.

17 Claims, 5 Drawing Sheets

(56) References Cited

U.S. PATENT DOCUMENTS

| | | |
|---|---|---|
| 2017/0213083 A1* | 7/2017 | Shriver ................ G06V 20/188 |
| 2017/0213141 A1* | 7/2017 | Xu .......................... G06Q 50/02 |
| 2018/0018517 A1* | 1/2018 | Zhong .................. G06V 20/188 |
| 2018/0146624 A1* | 5/2018 | Chen .................. G05B 13/0265 |
| 2020/0151831 A1* | 5/2020 | Xu .......................... G06Q 50/02 |
| 2021/0235612 A1 | 8/2021 | Tewari |
| 2021/0255362 A1* | 8/2021 | Xiang ..................... G01W 1/10 |

OTHER PUBLICATIONS

Written Opinion issued in App. No. PCT/EP2022/053604, dated Dec. 8, 2022, 7 pages.

\* cited by examiner

REMOTE SOIL AND VEGETATION PROPERTIES DETERMINATION METHOD AND SYSTEM

TECHNICAL FIELD

The present disclosure is in the field of remote sensing for precision agriculture and forestry, wherein remote data is used to determine soil and vegetation properties.

BACKGROUND

The use of remote sensing has allowed the development of precision agriculture and forestry due to the further monitoring of field dependent parameters. Some known approaches aim at measuring the normalized difference vegetation index (NDVI) which can be used for approximating Leaf Area Index, biomass, chlorophyll concentration in leaves, plant productivity, fractional vegetation cover, etc. Such relations are often derived by correlating space-derived NDVI values with ground-measured values of these variables. However, NDVI indications fail at estimating the soil properties. Some literature points towards comparing time series of the NDVI with respect to the long-term average to detect patterns of water stress, which is the case of the so-called Vegetation Condition Index (VCI) or the NDVI deviation, but said approach requires a high amount of data and processing work for said long term NDVI series.

Improving the knowledge of vegetation and soil properties within the field has a huge potential on improving the nitrogen variable rate application in the field, as well as variable water irrigation methods. Moreover, a remote sensing of soil and vegetation properties is of great help when surveilling and monitoring fields and forests for avoiding natural catastrophes (fires, land-slides, . . . ).

However, vegetation and soil maps at high resolution are cost and time consuming and are often not available at field scale.

Further, soil mapping is also an important input for crop growth models, which give an estimation of the in-field crop growth, N-uptake and yield.

The current method aims at providing an estimation of in-field heterogeneity of soil and vegetation properties which overcomes the above mentioned problems.

A further goal of the present invention is to provide the combination of satellite derived soil maps with crop and soil models for determining properties of the vegetation and soil present in the analyzed regions.

SUMMARY

According to a first aspect of the present disclosure, this and other objectives are achieved by means of a computer-implemented method for determining soil and/or vegetation properties of an agricultural field, comprising receiving remote data over a plurality of time frames, wherein the remote data comprises image data from at least one determined location comprising a plurality of spectral bands or optical domains of different wavelengths, and processing the remote data, wherein processing the remote data comprises the steps of generating at least one coefficient derived from the remote data, determining a rate of change of the at least one coefficient for at least one of the plurality of time frames, determining at least one soil and/or vegetation property value based on the determined rate of change of the at least one determined coefficient for at least one of the plurality of time frames.

Following this approach, soil and/or vegetation properties which otherwise are masked in the usual remote sensing approaches can be determined.

According to one embodiment determining the at least one soil or vegetation property value further includes the step of determining at least one of soil texture or relative soil type classification, soil moisture, soil organic matter, crop chlorophyll content, evapotranspiration rate, biomass index, crop yield, soil degradation and/or fire risks.

Following this approach, specific properties related to agricultural fields are determined in order to support the management of the fields.

According to a further embodiment, the remote data comprises image data of at least two spectral bands chosen from visible green, vegetation red edge, thermal infrared, near infrared, and short-wave infrared.

Following this approach, further properties can be determined with respect to the agricultural field.

According to a further embodiment, the method further comprises the steps of receiving weather data and/or field data and updating the at least one determined soil and/or vegetation property value based on the weather and/or field data.

Following this embodiment, a more accurate and reliable determination of the vegetation and/or soil properties is achieved.

According to a further embodiment, the method further comprises the steps of receiving weather data and/or field data and generating a mechanistic growth model based on the weather and/or field data and on the at least one coefficient derived from the remote data.

Following this approach, the properties can be further determined for the time periods where no remote data is available.

According to a further embodiment, the method further comprises the steps of using the rate of change of the at least one coefficient for the at least one of the plurality of time frames based on the mechanistic growth model and modeling the time evolution of the soil and/or vegetation property values.

Following this approach, model sensitivities can be accurately determined.

According to a further embodiment, the method comprises the step of correcting the at least one soil and/or vegetation property value based on the mechanistic growth model.

Following this approach, the accuracy of the method is improved by fine tuning the properties based on the modeled values.

According to a further embodiment, the method further comprises the step of using the at least one determined vegetation and/or soil property value to set a probability threshold value for an event, and creating an event log when and where the probability threshold value is exceeded.

Following this approach, the user or farmer is warned of possible undesired events.

According to a further embodiment, the step of receiving remote data, field and/or weather data over a plurality of time frames comprises at least one of the steps chosen from pre-processing, transforming, normalizing and/or pre-conditioning the remote, field and/or weather data.

Following this approach, the quality of the remote data is improved for further processing.

According to a further embodiment, the method comprises the step of producing an agricultural practice recommendation based on the at least one determined soil and/or vegetation property value, wherein the agricultural practice may comprise at least one of a nutrient application, irrigation and/or fertigation procedure, pesticide or fungicide application.

Following this approach, the user or farmer can improve the crop yield and condition of the agricultural field.

According to a further embodiment, the method comprises the step of configuring an agricultural system to carry out the agricultural practice recommendation.

Following this approach, an automated management of an agricultural field can be achieved.

According to a further embodiment, the method comprises the step of using the at least one determined property value for generating field maps for the agricultural field.

Following this approach, the user or farmer can base his decisions on a full representation of the properties across the agricultural field.

According to further embodiments, a data processing apparatus, a computer-readable storage medium and a computer program product configured to carry out the above discussed methods are envisaged within the present disclosure.

BRIEF DESCRIPTION OF THE FIGURES

The accompanying drawings, which are included to provide a further understanding of the present disclosure and are incorporated in and constitute a part of this specification, illustrate embodiments of the disclosure and together with the description serve to explain the principles of the disclosure.

The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

DETAILED DESCRIPTION

As used below in this text, the singular forms "a", "an", "the" include both the singular and the plural, unless the context clearly indicates otherwise. The terms "comprise", "comprises" as used below are synonymous with "including", "include" or "contain", "contains" and are inclusive or open and do not exclude additional unmentioned parts, elements or method steps. Where this description refers to a product or process which "comprises" specific features, parts or steps, this refers to the possibility that other features, parts or steps may also be present, but may also refer to embodiments which only contain the listed features, parts or steps.

The enumeration of numeric values by means of ranges of figures comprises all values and fractions in these ranges, as well as the cited end points. The term "approximately" as used when referring to a measurable value, such as a parameter, an amount, a time period, and the like, is intended to include variations of +/−10% or less, preferably +/−5% or less, more preferably +/−1% or less, and still more preferably +/−0.1% or less, of and from the specified value, in so far as the variations apply to the disclosure disclosed herein. It should be understood that the value to which the term "approximately" refers per se has also been disclosed.

Unless defined otherwise, all terms disclosed in the disclosure, including technical and scientific terms, have the meaning which a person skilled in the art usually gives them. For further guidance, definitions are included to further explain terms which are used in the description of the disclosure.

Figure 1:
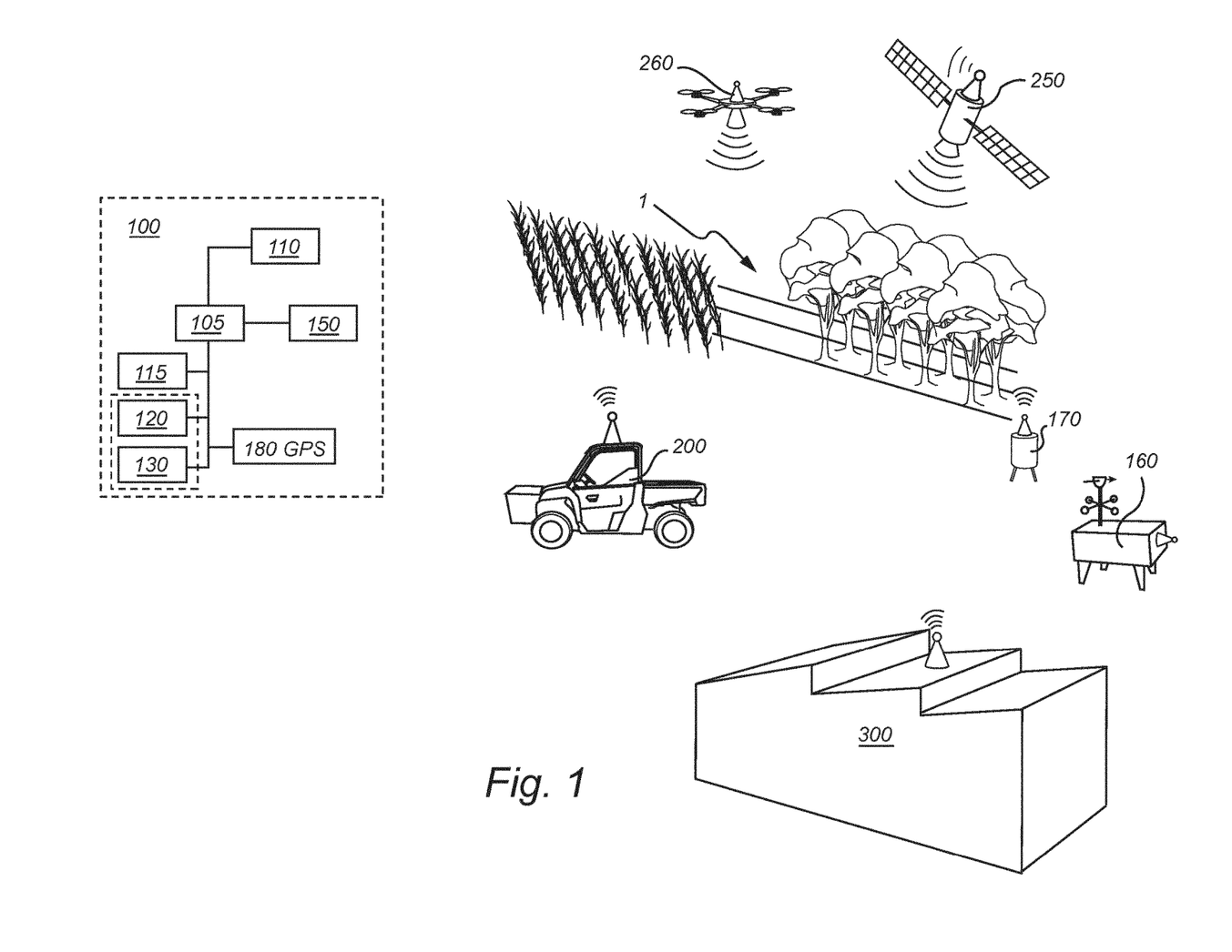
FIG. 1 shows a system according to the main embodiment.

In FIG. 1, an exemplary embodiment of a system according to the present disclosure is represented. FIG. 1 depicts an agricultural field 1, wherein different fields can be dedicated to agriculture or may be forestry lands. A computer system 100 according to the present disclosure may include components such as a processor 105, a wireless communication unit 110, a memory unit 115 a display 120 and an input unit 130, which might be combined as a touch sensitive screen, a plurality of sensor devices 150 relating to atmospheric conditions, a controller and a power supply and the like. System 100 may further include a location information module 180. Computer system 100 may represent handheld devices, desktop or mobile computers, on-board computers of agricultural appliances, other client-server architectures or any other electronic devices usually encompassed under the term data processing apparatus.

System 100 is configured to receive field data and external available data by means of the wireless communication unit 110 and/or the input unit 130. Field data may comprise amongst others, field and geographic identifiers, topographic data, crop identifiers, harvest data (crop variety and type, crop rotation), soil data (type, pH, soil organic matter (SOM) and/or cation exchange capacity, CEC), planting data, fertilizer application data, pesticide application data, irrigation data and other field reports. The system may be configured to retrieve soil data from available online soil databases like SoilGrids from the World Soil Information, SSURGO (Soil Survey Geographic Database from the United States Department of Agriculture) or any similar soil data repository. The system 100 may be further configured to have further field data from a predetermined number of locations within or nearby the analyzed region or nearby inputted manually by the user/farmer by means of the input unit 130 or received by the communication unit 110 from dedicated sensors 170. Further, the system may be configured to receive weather data from nearby weather stations 160 and/or external sensors 170, as well as by means of the input unit 130. Nearby weather stations 160 and/or external sensors 170 are configured to communicate via one or more networks. In another embodiment, weather data is provided by external weather forecast companies. Weather data includes temperature, accumulated precipitation, relative humidity, wind speed, solar radiance, accumulated sun hours, etc. Weather data may include as well past series of historic weather data for selected regions. Moreover, the computer system of the present application may additionally comprise sensors 170 or dedicated apps which can provide local environmental (e.g. air humidity, pressure or temperature amongst others) data.

Furthermore, memory unit 115 may store a plurality of application programs executed in the computer system 100, data for operations of the system 100, instructions, and the like. At least some of those application programs may be downloaded from an external server via wireless communication unit.

The location information module 180 denotes a module for detecting or calculating a position of the system 100. An example of the location information module 180 may include a Global Position System (GPS) module or a Wi-Fi module. As a module used to acquire the location of the system, the location information module 180 may not be necessarily limited to a module for directly calculating or acquiring the location of the terminal.

Although the present application is described related to a method and a computer-system which can be remotely located from the analyzed region or within its boundaries, the computer-system can be implemented in a stand-alone mobile device (e.g. a tablet, a smartphone) or integrated in or communicatively connected with an agricultural system 200 or farm management center 300 located in the analyzed region or nearby. Examples of agricultural systems include tractors, combines, harvesters, planters, trucks, fertilizer equipment, unmanned aerial or terrestrial vehicles, and any other item of physical machinery or hardware systems, like irrigation or fertigation systems, and which may be used in tasks associated with agriculture. These systems may be configured to apply fertilizers or other crop nutrition elements, as well as pesticides, fungicides or other crop protection treatments.

Despite the trivial considerations for the availability of the weather stations and local data, it is to be considered that improving agriculture yield and forestry management is a global problem. The enormous variability between a small holder in Southeast Asia or Africa and a farming company in Europe or America requires the consideration of different problematics when implementing the present method. While a big or medium-sized farming company may have at hand different weather station possibilities, as well as in-field sensors, together with broadband network systems, an individual small holder might only have a mobile device as electronic equipment available and a sub-standard mobile data network system. Same applies when considering forestry applications for the present method. Resource availability for determining soil/vegetation properties which can be of help in firefighting initiatives differ greatly as well due to the same economic constraints as outlined above, may it be referred to private or public sector of countries with different economic and development levels. Hence, it is required that the present approach considers said boundary conditions when evaluating the different solutions.

Figure 6:
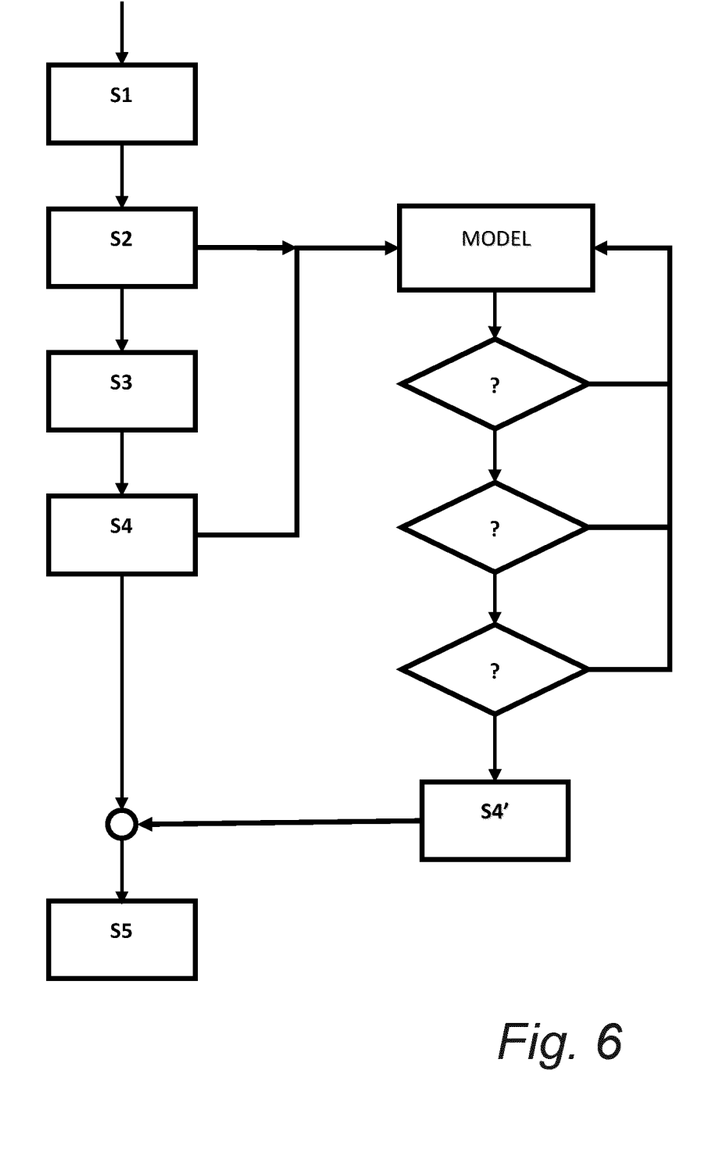
FIG. 6 shows an exemplary flowchart of an embodiment of the method of the present application.

The present application makes use of suitable remote data. Remote data can be referred to data provided by imaging satellites 250 or suitable unmanned aerial vehicles 260. These satellite or vehicle systems are configured to communicate by means of dedicated networks and usual methods which do not need being disclosed herein. Amongst the different remote data available for use, satellite data is nowadays widely available from numerous public (LANDSAT from NASA, SENTINEL from ESA) and/or private providers. The present method is however not limited to a satellite data platform, since the spectral bands which can be of use for the present method are provided in a big range of the standard satellite data and can as well be provided by means of drones or other unmanned aerial or terrestrial vehicles with image sensors in the required spectral bands. Hence, the method comprises receiving remote data (S1) as depicted in FIG. 6.

In an embodiment, remote data is obtained from the Sentinel-2 satellite. The Sentinel-2 mission contains a MSI (Multi Spectral Instrument) that takes high spatial resolution data in order to monitor Earth's surface. The MSI works passively, by collecting sunlight reflected from the Earth and is therefore a more efficient and less energy consuming detection method. Sentinel-2 consists of 13 bands with different spatial resolutions (10 m, 20 m or 60 m), in the visible, near infrared, and short-wave infrared part of the spectrum. In a preferred embodiment, the current method uses the image data related to spectral bands with wavelengths comprised between 700 and 850 nm. In a further embodiment, the present method uses date related to spectral bands with a wavelength of approximately 740 and 780 nm (which correspond in the Sentinel-2 case to spectral bands 6 and 7). The use of Sentinel-2 spectral bands from the MSI produces measurements with a high resolution (approx. 20 m), which to our knowledge has not been achieved before in similar approaches. In another embodiment, further data relating to different spectral bands is used for improving the determination of the present method. For example, the normalized-difference snow index (NDSI) comprises the use of spectral bands around the values of 530-610 nm (visible green) and 1550-1750 nm (short-wave infrared, SWIR) in order to determine areas covered by snow. Snow cover is as bright as the clouds, and this makes it difficult to differentiate it from the cloud cover. However, at around 1600 nm, snow cover absorbs sunlight and it appears therefore darker than the clouds. This enables an effective distinction between clouds and snow cover. Further compensation and calibration algorithms are considered in the present application, depending on the nature and origin of the remote data. In one embodiment, remote data is preprocessed for cloud and haze removal and light calibration, which is of advantage may the remote data be provided by means of a satellite as described above. In another embodiment, when the remote data is provided by an unmanned aerial vehicle or drone, cloud correction is not needed, but different light compensation procedures are envisaged to compensate for the sunlight characteristics and sun relative position.

Once the remote data has been received over a plurality of time frames, the remote data comprising each a series of time stamps reflecting the acquisition times within that time frame, wherein the remote data comprises imagery data from at least a determined location comprising a plurality of spectral bands or optical domains of different wavelengths, the system is configured to generate at least one coefficient derived from the remote data (S2). Different coefficients (or indexes) have been used in the literature for obtaining different agricultural, soil and vegetation information like the difference vegetation index and the normalized difference vegetation index (NDVI). However, NDVI is sensitive to the effects of soil brightness, soil color, atmosphere, clouds, cloud shadows, and leaf canopy shadows and requires remote sensing calibration. In that sense, further coefficients contemplated may comprise the Atmospherically Resistant Vegetation Index (ARVI) to reduce the dependence of atmospheric effects; the Soil-Adjusted Vegetation Index (SAVI) or the Type Soil Atmospheric Impedance Vegetation Index (TSARVI) which take into consideration the distinction of vegetation from the different types of soil background. Apart from the standard vegetation indexes comprised in the state of the art, the present application may make use of two further indexes which will be described in more detail below.

Figure 2:
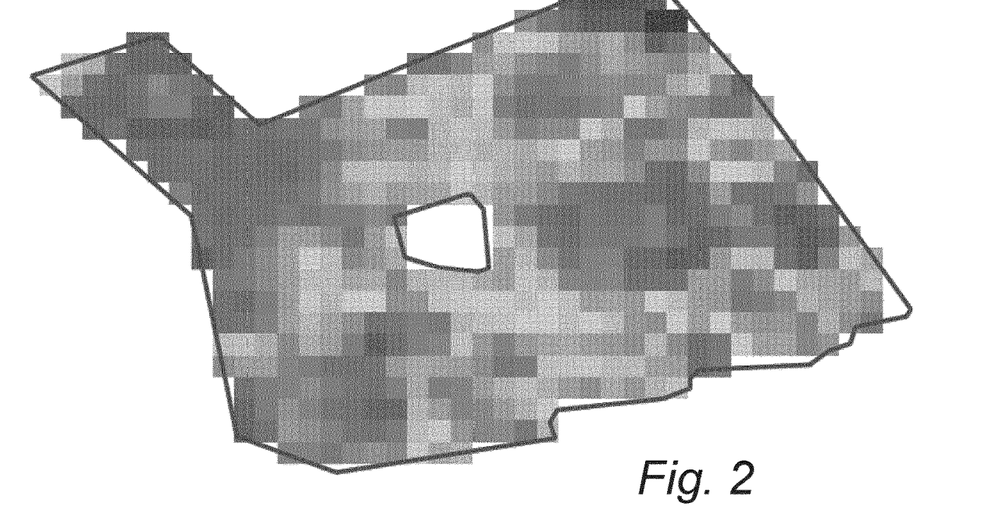
FIGS. 2 and 3 show the values of a generated coefficient for the designated region at two different time frames.
Figure 3:
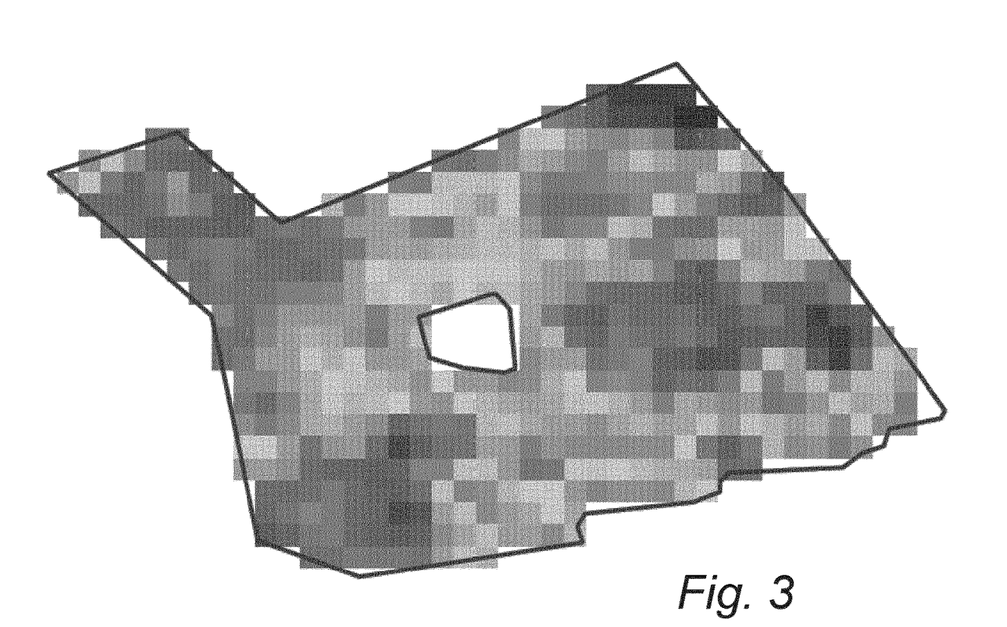

FIG. 2 shows how the value of the generated coefficients can be represented by means of a field map for the designated region at a certain time frame. FIG. 3 shows the value of the same generated coefficient as shown in FIG. 2, but at a further time frame, later than the time frame of FIG. 2. As it can be observed in the figures, represented data display a high in-field variability and may as well show different and heterogeneous time evolution. While certain patterns can be directly obtained by direct evaluation of the appropriate coefficients (e.g., some crops turn "greener" when growing), as will be discussed below, some vegetation and soil properties remain masked due to the different interrelated properties of an agricultural field which condition the coefficients.

In order to provide a reliable vegetation index which is indicative of the water and chlorophyll contents present in the vegetation, the further indexes of the application include different wavelengths timed to an edge of the chlorophyll absorption band, around the 730 nm band. In a further embodiment a further wavelength is considered in order to provide a reference for the chlorophyll absorption band, being this further wavelength chosen close to the chlorophyll absorption band, but having no or at least a reduced sensitivity at the chlorophyll absorption band, being this band comprised in a range of about 760 to 800 nm.

In a further embodiment, the remote data may comprise a further remote data comprising a second wavelength related to water absorption band, such as around 900-930 nm in order to provide a reference for the water determination. In another embodiment, the remote data may further comprise data from a third wavelength. This third wavelength may be about a wavelength of 670 nm in order to compensate for the effects of dew when the remote data is provided by drones operating in the early hours of the day. However, this third wavelength has been proven to compensate for the effects of atmospheric haze, therefore achieving a more reliable index which further improves the determination of the soil/plant properties. The system 100 may be then configured to subtract at least one of the second and third wavelengths, while providing a ratio of the used wavelengths.

Hence, formulations of a vegetation index according to the present considerations can be expressed as:

SN=100*Cc*(R760/R730−1), wherein Cc can be a calibration function or calibration constant determined in calibration and R760 and R730 represent the data relating to the respective wavelengths. Although the calibration constant Cc can represent the general calibration of the index, it is also possible that the R760 and R730 are calibrated individually. The present index is therefore sensitive to the chlorophyll content present in the vegetation and a direct relationship with the total amount of nitrogen within the canopy can be directly derived.

As mentioned above, a further wavelength can be included in order to compensate for dew for aerial pictures and atmospheric haze in satellite imaging. Such an index would then look like the following: SN'=100*Cd*((R760−R670)/(R730−R670)−1), wherein Cd can be a calibration function or calibration constant determined in calibration and R760, R730 and R670 represent the data relating to the respective wavelengths. Although the calibration constant can represent the general calibration of the index, it is also possible that the R760, R670 and R730 are calibrated individually.

Further, instead of, or in addition to, determining chlorophyll, or nitrogen uptake, dry biomass can be determined. The biomass determination can be independent of chlorophyll. Dry mass can e.g. be calculated from SDM=100*Cw*(R900/R970−1) or from SDM'=100*Cw*((R900−R670)/(R970−R670)−1), wherein, as before, Cw can be a calibration function or calibration constant determined in calibration and it is also possible that the R900, R670 and R970 are calibrated individually.

The above listed indexes present a better signal to noise ratio and are less prone to saturation at higher levels and allow therefore an improved determination of the vegetation and soil properties. However, the list of coefficients (or indexes) is not meant to be limiting. There is a great variance of different coefficients which are as well able of being used by the present method, without herewith limiting the extent of the present method to a single one. Moreover, although the use of visible green, vegetation red edge, thermal infrared, near infrared, and short-wave infrared bands is intended since these are usually the ones reflecting most of the phenomena occurring in vegetation, the present method is not limited to only these bands.

Once the at least one coefficient has been generated for the plurality of remote data obtained over a plurality of time frames, the rate of change of the at least one coefficient is determined based on the value of the at least one coefficient in at least one of the plurality of remote data time frames (S3). In a further embodiment, the method of the present application may use the at least one coefficient generated to determine a physical quantity of the vegetation and/or soil. The use of the values of vegetation indexes for determining different properties of the vegetation and/or soil is already known per se in the prior art and the determination of chlorophyll, nitrogen uptake and biomass may be computed for consideration in the mechanistic growth model of the agricultural field.

Figure 4:
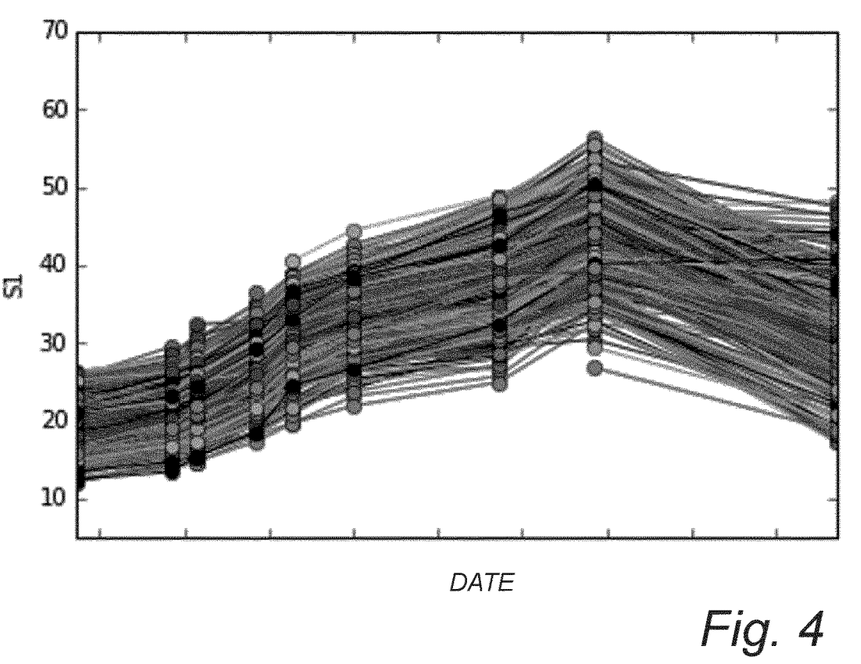
FIG. 4 shows the time evolution of the generated coefficient for different locations within the designated region.

FIG. 4 shows along those lines the time evolution of the at least one coefficient for the different locations within a designated region of an agricultural field. In this case, the coefficients are generated along the spring months of a single season. As the crop matures, the generated coefficient increase. As it can be seen in the picture, although the values for each of the different locations comprised within the designated regions vary greatly (for each single date, the values can differ more than 100%) a certain trend is observable, in which the generated coefficients present a similar rate or change for at least a subset of the defined points in the agricultural field, which hints towards a certain property which biases the time evolution of the at least one parameter towards a certain growth/decrease.

Due to the analysis of the rate of change of the at least one coefficient construed from the image data of the field, an advantageous effect of the present disclosure will be made clear through the determination of said trends. Most of the available image data processing for field or vegetated land analysis use single images related to a fixed point in time to determine the soil/vegetation properties. However, based on research, it is clear from the data that said individual images cannot reflect entirely the variability of the field, vegetation and soil texture due to infield heterogeneity, whereas the present application can take these changes into account. In a simplified case of an embodiment, assuming that the field is well-supplied in terms of nutrients and free of diseases and weeds, pixels with lower slopes are expected to reflect spots of low water supply. During periods with no water limitation, slopes should be similar between pixels, although they can vary in absolute values. However, when water is limiting, slopes on light textured soils increase/decrease less than heavy soils due to the lower plant water availability in these soil types. Thanks to this determination of the specific soil texture, other effects which could influence the readings and mask the aimed parameters to be determined are removed from the evaluation, allowing this a more precise determination of the soil texture and therefore the vegetation properties.

As such, the Rate of Change for a coefficient S at a given time frame, wherein S can be any of the coefficients listed above, is determined according to the following formula:

$$S_{ROCn+1}=[S_{Date(n+1)}-S_{Date(n)}]/\text{time elapsed};$$

Figure 5:
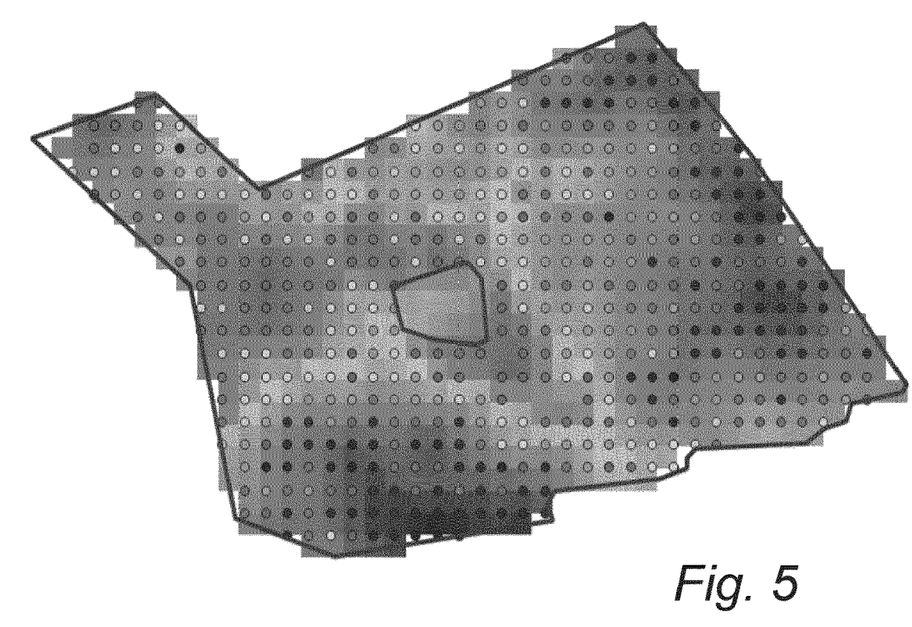
FIG. 5 shows the rate of change of the generated coefficient for the designated region.
Figure 7:
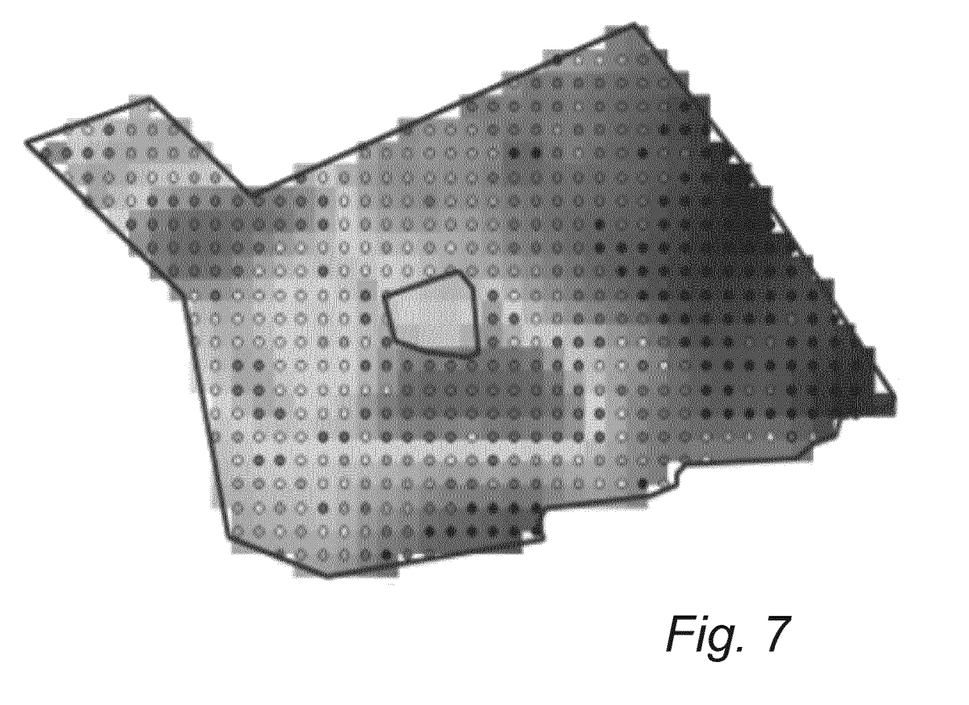
FIG. 7 shows field data regarding crop yield of the designated region for the analyzed time frames.

While the computation of the rate of change can be intended to a selected single time frame between two received image data, the method is not limited to this and may further comprise analyzing the rate of change of the coefficient at a plurality of time frames. The effects of this transformation can be observed in FIG. 5. The present figure shows the rate of change for two consecutive days with data availability as depicted in FIGS. 2 and 3, computed by means of the equation shown above, wherein the time elapsed used for the computation of the rate of change is the time elapsed between the two times when the remote data was collected. As it can be seen, in comparison with the distribution of the coefficient values as shown in FIGS. 3 and 4, the generated rate of change, as shown in FIG. 5 has a more homogenous distribution. FIG. 5 shows not only the actual values (as represented by the circles) but as well an interpolated distribution of the values of the rate of change of the at least one coefficient as represented by the square cells, shaded according to the value of the rate of change interpolated over several neighboring values. Moreover, as it can be seen when comparing with the actual field data for the analyzed region in FIG. 7, the at least one determined vegetation and/or soil property value displays a greater spatial correlation with the in-field variation with the actual data.

After computation of the rate of change for the generated coefficients, the soil and/or vegetation property values are determined based on the determined rate of change of the determined coefficient for at least one of the plurality of time frames (S4). For example, as mentioned above, in water scarcity conditions, soil texture and soil water holding capacity of the soil can be determined with an increased resolution such that the in-field variability can be observed, helping the user to take appropriate actions. While the soil water holding capacity can be directly determined based on the rate of change of the respective determined coefficient, in a preferred embodiment the soil texture may be determined by means of a relative soil type classification, wherein the rate of change is normalized between the occurring values to a number between 0 and 1. Although such a parameterization does not allow the direct translation of soil texture to the equivalent physical and chemical properties, determining such a value for the respective property is of advantage for achieving a better decision making process regarding agricultural practices like irrigation, fertigation, N-dosage, tillage practices, and other forestry practices as well as for updating the value of certain other related properties which can be adapted to take this otherwise hidden in-field variability of the analyzed property. Corresponding parametrizations following the lines of the embodiment previously described are envisaged for corresponding properties which cannot be expressed by means of the present method. Hence, once the at least one of the soil and/or vegetation property value has been determined, other vegetation and/or soil property values may be determined as well, directly by analysis of the corresponding coefficients or indirectly, using the already determined property value to improve the computation of other related vegetation and/or soil property values, as will be made clear below. For example, soil moisture, soil organic matter (SOM), biomass, N-uptake can be as well determined considering the infield variability of the computed soil texture and water holding capacity, which relates as well to the soil moisture.

In a further embodiment, the method of the present application is configured to receive historic weather data (comprising temperature, accumulated precipitation, relative humidity, wind speed, solar radiance and/or accumulated sun hours, comprising a respective time stamp indicative of the time when said weather conditions occur) and/or field data as discussed above. Following the above simplified case, when the system is configured to determine a soil texture, further time series of weather data in which no precipitation occurred are determined, wherein these past time series of water drought conditions can be retrieved in order to compute the soil texture at a different past time. Since soil texture is considered to have slow dynamics, past time series occurring in the near past can be assumed to represent soil texture conditions close to the present soil texture conditions. Hence, said time evolution of soil properties may be used to further increase the accuracy of the present method. However, soil properties can change over time, showing levels of soil degradation, for example, on a larger time dynamic. By determining soil degradation when the change of the soil properties over time exceeds a certain threshold, further catastrophic events like landslides can be prevented, as well as certain agricultural practices recommended to diminish the soil degradation. While this example has been analyzed in detail, the present method is not intended to be limited by it. The present approach may as well be used to determine other vegetation and/or soil property values like soil moisture, vegetation biomass, evapotranspiration or the like, by means of the suitable generated coefficient, which when associated to the corresponding boundary condition (e.g., a weather event like accumulated precipitation, a given irrigation amount or temperature evolution), can be determined with a greater accuracy once these factors are taken into consideration with the rate of change of the determined coefficient. For example, temperature and accumulated sun hours have a strong influence on the evapotranspiration, and therefore on the soil moisture, present at a certain region of the agricultural field. Taking the temperature data into consideration increases therefore the precision of the present approach. A general view of an embodiment of the method of the present application is shown in FIG. 6, wherein no general limitation as to the different embodiments disclosed in the present application is intended.

Further, in another embodiment, the system is configured to produce an agricultural practice recommendation based on the determined property values. For example, based on soil texture, appropriate tillage, as well as irrigation, fertilizing or fertigation and harvesting practices can be determined. Moreover, due to the long-time series analyzed, the user or farmer can be notified by means of an alarm or an event log, that certain limit properties are appearing which could endanger the suitability of the terrain for farming or compromise the state of forestry or agricultural areas regarding landslides or fire.

In a further embodiment, in order to gain further insights derived from the obtained coefficients, the insights gained by means of the remote data acquisition and processing are complemented with the incorporation of a mechanistic growth model to increase the robustness of the present approach and gain further insight into other parameters and variables of the analyzed fields. A model is hereby understood to comprise a series of digitally constructed equations or parametrizations which can be used, upon the introduction of different values, to represent data of past, current or future events. The present model may be generated using at least one of the data mentioned above. While the complexity of the model increases the reliability and the precision of the modeled variables, in specific cases linear models elaborated for simulating and surveilling a single quantity suffice. In an embodiment, the model may comprise past, present and predicted weather data, as well as atmospheric and environmental data and field data. Moreover, further local sensed data can be incorporated into the models as it will be made clear below. Although a model is usually understood as a set of mathematical equations, the present application is not designed to be limited to such an example and the models herein represented can be AI generated "black-box" models, wherein the use of common machine learning algorithms, like a Random Forest Model or any other non-parametric machine learning model, are envisaged. Models may be determined upon setting certain hypotheses with a great variety of tools and methods. For example, the use of convolutional neural networks (CNN) and/or the use of linear or non-linear regression models to determine the parameters and different coefficient which decide the model behavior are per se well known from the prior art and therefore will not be described in further detail herein. By using these mechanistic growth models for an agricultural field, it is expected to model the time evolution or behavior of a defined subset of field variables (e.g. in certain embodiments, plant growth and yield, nutrient presence and concentration) which have a certain relation (either expressed mathematically by means of equations modelling physical phenomena or by means of transfer functions) with respect to other parameters or variables in the model. Hence, the present method may comprise obtaining the value of at least one property value based on the value of the at least one generated coefficient, wherein the at least one value is used in the mechanistic growth model to determine other properties and compute the time evolution of the selected subset of variables, as depicted in FIG. 6.

In a further embodiment, the model is used for correcting and/or updating the at least one determined soil and/or vegetation property value and improving the reliability of the present approach (S4'). Remote data can be affected by meteorological and atmospheric conditions (e.g. clouds, dust) affecting the quality of the remote data in certain regions and/or blocking completely certain areas of the analyzed region. Remote data is as well of a discrete nature and provides data at discrete points of time along the analyzed time frames. Same happens in the case of unmanned vehicles, since usually the unmanned vehicles cannot be permanently deployed and therefore have periods in which no remote data can be used for the determination of the soil/vegetation properties. Further, in both cases the data provided can be affected by noise and other data communication problems and a consistency and quality check of the remote data (SNR, availability of the signal) can be performed. Therefore, a model for evaluation of the continuous evolution of the soil/vegetation properties further improves the reliability of the determined properties.

In a further embodiment, the method according to the present disclosure may be configured to access databases or local sensing devices as explained above which further comprise local field data of different soil and/or vegetation property values. As mentioned above, different databases and repositories are available to the public regarding soil properties, terrain orography, past and present field and/or crop data. This data might be related to local-specific data (like the terrain orography), time-specific data (crop data) or both, like soil data. However, although some properties can be compared directly with the respective data as listed in these databases, this is not always the case, as for soil texture above, this data cannot always be directly compared with the property values obtained by the present method. For example, soil moisture data, when available, can be considered to reflect a precise value of a determined magnitude and easily correlated with the readings of the present method. However, soil properties, comprising texture data, is usually defined according to different values like bulk density, clay/sand/silt contents, as well as other chemical properties like cation exchange capacity (CEC), soil organic matter (SOM) or pH. In order to be able to correlate the database data with the properties determined by the present method, a transformation and normalization is carried out, wherein the different related parameters are given as input data, and based on the properties as determined by the present method for different location and times related to the acquisition time and/or location of the data, a corresponding transformation process is generated, followed by a normalization procedure to standardize a value representative of the respective property. By means of the present embodiment, the present method may further increase the accuracy of the determined properties, using the local existing data present in different databases for the respective property. Similar approaches can be followed regarding orographic terrain data or further field and crop data, which are in turn incorporated to the mechanistic growth model to increase the precision of the model. In another embodiment, soil moisture and texture properties determination can be improved by the consideration of terrain orography. Field topography has an impact on lateral water flow and therefore can be used to increase the accuracy of the present method by incorporating a water displacement gradient derived by the topography data, thereby correcting the expected soil texture as derived from the determined water holding capacity and the determined soil texture based on the rate of change of the at least one coefficient. These examples have been explained in detail as orientation, but the present method is not limited to them. The determination of other properties can more accurately be determined deriving from the introduced data regarding crop type and crop intensity in order to determine evapotranspiration as well as the determination of crop growth stages (growth, senescence) and yield estimation, which may further be used to improve the determination of respective vegetation and/or soil parameters like biomass or soil moisture.

Another advantageous result of the present approach is that for those times in which remote data is available, the inclusion of the rate of change of the determined coefficients help improving the accuracy of the computed model. Taking into consideration both the values of the at least one determined coefficient and the respective rate(s) of change of the at least one determined coefficient, model parameters can be more accurately determined, by carrying out a sensitivity analysis of the model outputs related to the model inputs.

As explained above, due to the discrete nature of the data provided, remote data might not fully provide support for taking into consideration present time local time-limited variations (e.g. local weather conditions and atmospheric conditions amongst others) or account for in-field local heterogeneity. In order to compensate for the variations the present method and system may include a communication device configured to receive present weather information and/or may comprise a series of sensors to measure local atmospheric conditions (e.g., temperatures, pressure, humidity) and/or soil data (soil color, salinity, pH, soil organic matter, or other properties), field data, crop data and/or vegetation data (for example by means of Yara's N-sensor™ or any other suitable nitrogen or chlorophyll sensor, Yara's ZIM™ sensor for determining plant water content) and/or any further related properties at one or more locations of the analyzed and/or nearby regions. Hence, the used model can be used continuously to account for variations due to local rains or other meteorological or atmospheric local events, which cannot be accounted for by means of using solely the remote data. The method of the present disclosure is therefore configured to receive the data by means of a communication unit configured to receive the data from the nearby weather stations and/or providers and/or sensors. Nowadays, common smartphones are provided with sensors which are able of providing direct measurements of ambient conditions (temperature, pressure) or are configured to determine the ambient conditions as a function of the available sensors (e.g., external temperature can be computed as a function of the steady state internal battery temperature). The present system may as well comprise input means for allowing the manual introduction of the weather, atmospheric conditions, soil, field, crop and/or vegetation data by means of a dedicated user interface in system 100 upon a prompting request of the system. It is therefore advantageous to access all the available local data and use it for improving the accuracy of the measurements.

Remote measurement methods for soil and vegetation properties can profit from these different available sensors on a local basis or weather report information from nearby or external weather stations in view of the above-mentioned problems. As such, in further embodiments, the acquired weather and/or atmospheric and/or vegetation data is used to improve the vegetation and/or soil property values as delivered by the model of the analyzed region. In order to fully profit from the model and the remote data, different operating modes are envisaged, which will be described here below.

In a further embodiment, the present method may include allowing the user or prompting the user to receive manual entry of further data available upon checking of the location of the computer system. As such, the user, when in or nearby the analyzed region or when able to access the data irrespective or where the user is at, may manually provide data which can be used for improving the measurements (weather, soil, temperature, rain, . . . ) taking into consideration the location data provided by the data, the user and/or the system. As such, a consistency check during the present operating mode can be effectuated to determine if the inputted data and the data determined from remote readings deviate from each other over a certain predefined threshold. If the deviation is determined to be over the predefined threshold, a correction step can be effectuated to improve the determination of the soil and/or vegetation property values.

In a further operating mode, during the periods when both remote data and external weather/atmospheric information are available, the method collects data to improve the model accuracy and predictions by means of machine learning algorithms, using, as mentioned before, the value of the at least one determined coefficient together with the corresponding rate of change. This operating mode aims at training the model and developing the accuracy of the whole system. Further, a consistency check during the present operating mode can be effectuated to determine if the simulated data and the data determined from remote readings deviate from each other over a certain threshold. If the deviation is considered to be over the certain threshold, a correction step can be effectuated to more accurately determine the soil/vegetation property values. This step can be as well done retroactively, in such a way that the predictions generated at a given time, are compared to the measured or sensed properties at a further point time after the previously given time, a further correction step is carried out for further improving the accuracy of the model.

In a further embodiment, the step of receiving remote data, field and/or weather data over a plurality of time frames comprises at least one of the steps chosen from pre-processing, transforming, normalizing and/or pre-conditioning the remote, field and/or weather data. Remote data can be of a noisy nature and usual procedures for correcting ambient noise, atmospheric noise as well as transformations accounting for the measurement specificities. Pre-processing remote data may involve geometric and/or radiometric calibration, and/or filtering. Further pre-processing algorithms for removing clouds, cloud shadows or other atmospheric corrections are as well envisaged. Field data may as well be transformed, normalized and/or pre-conditioned according to some of the embodiments shown in the present disclosure for the vegetation and soil property values. Correspondingly, weather data may further be averaged, filtered or normalized in order to ease and adapt the data to the method of the present disclosure.

In a further operating mode, when remote data is not fully available or it is determined that some of the received data does not comply with the minimum data quality required for the determination of the soil/vegetation properties as explained above, the method of the present disclosure executes a correction step in which the soil/vegetation property values are approximated by the model. In further embodiments of this operating mode, the present method may determine the quality and/or availability of the remote data for at least a part of the analyzed region based on the data consistency and/or signal quality (SNR). In a further embodiment, the part of the analyzed region wherein the remote data is not available comprises at least 30% of the analyzed region. In a further embodiment, the part amounts to at least 20% of the analyzed region. In a further embodiment, the part amounts to at least 10% of the analyzed region. This embodiment presents the advantage that for current time series, where no remote data is available, a model generated property value is still available for the user to appropriately manage the agricultural field.

In a further operating mode, when local weather data and/or atmospheric data is made available, the model is configured to update and correct the variables which are related or dependent to the weather and/or atmospheric data, like the soil moisture content and evapotranspiration rate amongst others.

In a further operating mode, wherein the at least one determined vegetation and/or soil property value is used to set a probability threshold value for an event, and wherein were the probability threshold value is exceeded, an event log is created. Moreover, when historical weather data is available, past time series of the weather data can be processed for enhancing the model accuracy. Moreover, when having available historical weather data, further records of local data can be added to check the repetition of similar patterns, allowing the extraction of further defining features. For example, a farm might have records of the past crop yields, pests, water scarcity and/or abundancy periods. Correspondingly, a forestry management service might have data of past local fires and their possible cause (natural or human-related cause). When processing the past data and events, the present method can be improved towards the prediction of these events by means of creating an event log, which the system 100 is configured to record and may be configured to react to it and/or which can be notified to the user in different forms, helping in the avoidance of said unwanted events.

The discussed model may comprise different variables and states depending on the at least one property value to be determined. For example, in order to determine the influence of evapotranspiration with respect to the loss of water at soil and vegetation level (hence reducing the soil moisture), the present model can be configured to include a biomass index relating to the amount of vegetation present in the analyzed regions. The model may comprise a transfer function relating the amount of water lost through evapotranspiration as a consequence of the amount of determined biomass. In a further embodiment, the present system further includes a temperature reading to more accurately predict the amount of water lost by means of evapotranspiration by the present method. In a further embodiment, the model may further comprise determining the size and type of canopy present in the analyzed region based on remote data in order to more accurately determine the amount of evaporated water.

Once the information on the soil and/or vegetation property values has been improved by means of the method of the present disclosure, usual agricultural practice recommendations can be produced based on the determined soil and/or vegetation properties. The system may be further configured to determine, based on the existing field data and the determined properties, different recommendations for nitrogen applications, planting procedures, tillage procedures, irrigation or fertigation practices. Further, variable rate application of fertilizers can be improved due to the considered higher resolution of the in-field variations and resulting heterogeneity of the determined properties. The system of the present application may be further configured to output scripts for field implements or generate field maps for the agricultural field, hereby supporting the user or farmer in decision making regarding the procedures to be undertaken on the agricultural field as well as programming the field implements.

While the present disclosure has been illustrated by a description of various embodiments and while these embodiments have been described in considerable detail, it is not the intention of the applicant to restrict or in any way limit the scope of the appended claims to such detail. Additional advantages and modifications will readily appear to those skilled in the art. The disclosure in its broader aspects is therefore not limited to the specific details, representative apparatus and method, and illustrative example shown and described.

The invention claimed is:

1. A computer-implemented method for determining soil and/or vegetation properties of an agricultural field, wherein the method is performed by executing a computer program on a processor and comprises steps of:
   receiving remote data, via a communication unit, over a plurality of time frames, wherein the remote data comprises image data from at least one determined location comprising a plurality of spectral bands or optical domains of different wavelengths; and
   processing the remote data, wherein processing the remote data comprises steps of:
      generating, by executing the computer program on the processor, at least one coefficient derived from the remote data;
      determining, by executing the computer program on the processor, a rate of change of the at least one coefficient at the plurality of time frames; and
      determining, by executing the computer program on the processor, at least one soil and/or vegetation property value based on the rate of change of the at least one coefficient for at least one of the plurality of time frames;
   producing an agricultural practice recommendation based on the at least one soil and/or vegetation property value, wherein the agricultural practice recommendation comprises at least one of a nutrient application, irrigation and/or fertigation procedure, pesticide or fungicide application.

2. The computer-implemented method according to claim 1, wherein the determining the at least one soil and/or vegetation property value further includes a step of determining of at least one of soil texture or relative soil type classification, soil moisture, soil organic matter, crop chlorophyll content, evapotranspiration rate, biomass index, crop yield, soil degradation and/or fire risks.

3. The computer-implemented method according to claim 1, wherein the remote data comprises image data of at least two spectral bands chosen from visible green, vegetation red edge, thermal infrared, near infrared, or short-wave infrared.

4. The computer-implemented method according to claim 1, further comprising steps of receiving weather data and/or field data, and updating the at least one soil and/or vegetation property value based on the weather data and/or field data.

5. The computer-implemented method according to claim 1, further comprising steps of receiving weather data and/or field data, and generating a mechanistic growth model based on the weather data and/or field data and on the at least one coefficient derived from the remote data.

6. The computer-implemented method according to claim 5, further comprising steps of using the rate of change of the at least one coefficient for at least one of the plurality of time frames based on the mechanistic growth model and modeling a time evolution of the at least one soil and/or vegetation property value.

7. The computer-implemented method according to claim 5, further comprising a step of correcting the at least one soil and/or vegetation property value based on the mechanistic growth model.

8. The computer-implemented method according to claim 5, further comprising a step of using at least one determined vegetation and/or soil property value is used to set a probability threshold value for an event, and create an event log when and where the probability threshold value is exceeded.

9. The computer-implemented method according to claim 1, wherein the step of receiving the remote data, field and/or weather data over the plurality of time frames comprises at least one of the steps chosen from pre-processing, transforming, normalizing and/or pre-conditioning the remote, field and/or weather data.

10. The computer-implemented method according to claim 1, further comprising a step of configuring an agricultural system to carry out the agricultural practice recommendation.

11. The computer-implemented method according to claim 1, further comprising a step of generating field maps for the agricultural field using the at least one soil and/or vegetation property value and displaying the field map on an electronic display.

12. A data processing apparatus comprising means for carrying out the computer-implemented method of claim 1.

13. A non-transitory computer-readable storage medium comprising instructions which, when executed by a computer system, cause the computer system to carry out the computer-implemented method of claim 1.

14. A computer program product stored on a non-transitory computer readable medium comprising instructions which, when the computer program product is executed by a computer system, cause the computer system to carry out the computer-implemented method of claim 1.

15. The computer-implemented method according to claim 10, wherein the agricultural system includes at least one of a tractor, a combine, a harvester, a planter, a truck, a fertilizer equipment, an unmanned aerial or terrestrial vehicle, or an irrigation or fertigation system.

16. The computer-implemented method according to claim 1, wherein the at least one coefficient is one of a difference vegetation index, a normalized difference vegetation index (NDVI), an atmospherically resistant vegetation index (ARVI), a soil-adjusted vegetation index (SAVI), or a type soil atmospheric impedance vegetation index (TSARVI).

17. The computer-implemented method according to claim 1, wherein the plurality of spectral bands or optical domains of different wavelengths in the remote data include spectral bands with wavelengths comprised between 700 and 850 nm.

* * * * *